United States Patent [19]
Farr

[11] Patent Number: 5,403,078
[45] Date of Patent: Apr. 4, 1995

[54] HYDRAULIC BRAKING SYSTEMS FOR VEHICLES

[75] Inventor: Glyn P. R. Farr, Warwickshire, England

[73] Assignee: Lucas Industries Public Limited Company, England

[21] Appl. No.: 148,978

[22] Filed: Nov. 8, 1993

[30] Foreign Application Priority Data

Nov. 12, 1992 [GB] United Kingdom ............... 9223702

[51] Int. Cl.⁶ ............................................. B60T 13/13
[52] U.S. Cl. ................... 303/117.1; 188/352; 188/353; 303/10; 303/113.2; 303/114.1; 303/115.4
[58] Field of Search ............ 303/9.62, 9.72, 10, 303/20, 113.1, 113.2, 113.5, 114.1, 116.2, 117.1, 92, 900, DIG. 2, 115.4, 115.5; 364/426.02, 426.03; 188/352, 353

[56] References Cited

U.S. PATENT DOCUMENTS

| | | | |
|---|---|---|---|
| 4,869,560 | 9/1989 | Nishil | 303/114.1 |
| 5,112,114 | 5/1992 | Cogswell, II et al. | 303/117.1 X |

FOREIGN PATENT DOCUMENTS

| | | | |
|---|---|---|---|
| 121560 | 5/1988 | Japan | 188/352 |
| 1106760 | 4/1989 | Japan | 303/116.2 |
| 60864 | 3/1990 | Japan | 188/353 |
| 2074447 | 3/1990 | Japan | 303/117.1 |
| 5069807 | 3/1993 | Japan | 303/117.1 |

Primary Examiner—Robert J. Oberleitner
Assistant Examiner—Alfred Muratori
Attorney, Agent, or Firm—Laff, Whitesel, Conte & Saret, Ltd.

[57] ABSTRACT

An hydraulic braking system for a vehicle comprises a pedal-operated combined hydraulic booster and master cylinder assembly (1) for applying a brake (15, 18) on a wheel (16, 19) and having a master cylinder (6) and a servo chamber (7), an auxiliary hydraulic power supply (10) defining a booster pressure in the servo chamber, a flow valve (17, 20) through which fluid is supplied to the brake, and a solenoid-controlled valve (27) for controlling the setting of the flow valve for brake re-application during ABS by the application to it of control fluid from the servo chamber (7) in response to signals from a control module (38).

14 Claims, 6 Drawing Sheets

HYDRAULIC BRAKING SYSTEMS FOR VEHICLES

This invention relates to hydraulic braking systems for vehicles of the kind in which a brake on a wheel of a vehicle is adapted to be applied by a pedal-operated master cylinder, and an auxiliary source of pressure, and solenoid-controlled valve means are incorporated for controlling the application of the brake in response to signals from an electronic control module.

In systems of the kind set forth the brake can be re-applied for anti-lock control (ABS), for brake pressure application and/or retention as a "hill holder" to hold the vehicle on an upwardly facing hill, or independently of the master cylinder to apply the brake on a spinning wheel for Traction Control.

In some known systems of the kind set forth the auxiliary source of pressure is provided by an electrically driven pump which is adapted to pump fluid back to the master cylinder during ABS with attendant noise and vibration.

In braking systems of the kind set forth it is known to control the rate of brake re-application by the use of a flow valve. In the system of EP-A-0 202 845 full pump or accumulator pressure is applied to the flow valve to achieve brake re-application during ABS. Such high pressures may cause leaks in the system, and under some circumstances, are difficult to control in practice.

There is a requirement in a braking system with compact actuation to suit the confined installation space in the engine compartment of modern and future vehicles where the front windscreen is styled to extend over the front of the vehicle, particularly when the vehicle is a car. In addition, the increasing use of direct fuel injection engines, both diesel and petrol, will eliminate the vacuum power normally available for assistance to the driver's applied force.

According to our invention an hydraulic braking system for a vehicle comprises a pedal-operated hydraulic booster and master cylinder assembly for applying a brake on a wheel and having a master cylinder and a servo chamber, an auxiliary hydraulic power supply defining a booster pressure in the servo chamber, a flow valve assembly through which fluid is supplied to the brake, and a solenoid-controlled valve means for controlling the setting of the flow valve at least for brake re-application during ABS by the application to it of control fluid from the servo chamber in response to signals from a control module.

Since the pressure in the servo chamber is substantially the same as that demanded by the operator at the master cylinder, utilising this as the control fluid during ABS ensures that the control system is not subjected to excess pressures, and attendant noise and vibration is substantially eliminated since pressure is not pumped back to the master cylinder.

The auxiliary hydraulic power supply preferably comprises an electrically driven pump, and an hydraulic accumulator charged by the pump, which is standard equipment. Such a power supply can be utilised to provide the necessary power to re-apply the brake during ABS, retain or apply brake pressure to act as a hill holder, apply the brake on a spinning wheel independently of the master cylinder for Traction Control, and achieve brake bleeding after assembly on the vehicle.

The solenoid-controlled means may comprise a single first solenoid-controlled valve situated in a return line from the flow valve to a reservoir for fluid, suitably the reservoir for the master cylinder. Normally the first valve is closed so that the control fluid holds the flow valve in a fully open position in which fluid can be applied from the master cylinder to the brake through an unrestricted path. When the first valve opens connecting the flow valve to the reservoir, the force applied by the control fluid is removed so that the flow valve moves against the spring loading sequentially to isolate the master cylinder from the brake, connect the brake to the reservoir, and move to a metering position in which fluid from the servo-chamber can be metered into the brake at a controlled rate.

When the solenoid-controlled valve means comprises the first solenoid-controlled valve and the addition of two further second and third solenoid-controlled valves, the second and third valves are located respectively between the accumulator and the flow valve, and at the outlet from the servo chamber, so that the system can be adapted for traction control on the spinning wheel and to enable the system to act as a hill holder.

Traction control is achieved by closing the third valve to prevent reverse flow into the servo chamber, opening the second valve to supply fluid to the flow valve, and at the same time pulsing the first valve so that control fluid sets the flow valve in a latched position with the brake applied from the accumulator but isolated from the master cylinder itself.

This construction has the advantage that pressure fluid is supplied only to the brake on the spinning wheel of the pair of driven wheels on a common axle and on which the respective first valve has been operated.

To act as a hill holder in order to brake the wheels on the rear axle of a vehicle the third valve is closed, the second valve is opened, and the respective first valve is pulsed to latch a flow valve assembly for the rear brakes, thereby applying accumulator pressure to both rear brakes to simulate operation of a manual parking brake.

To achieve brake bleeding the control module is set in a "bleed mode" in which the solenoid-controlled valve means is opened and, by holding the brake pedal in a depressed position, the auxiliary power supply is adapted to fill the flow valve and brake circuits. No special pumping or evacuation procedures are required, and no additional pipes or bleed screws are needed.

The flow valve conveniently comprises a housing having an axial bore, a spool working in the bore, a spring urging the spool against a stop defined by one end of the bore, in which the spool is provided with a pair of axially spaced annular grooves with the master cylinder connected to the brake through the first annular groove, and the servo chamber connected to the second annular groove, at least one radial passage connecting the second annular groove to a longitudinal passage extending between opposite ends of the spool with a restricted orifice disposed in the spool between the radial passage and the end of the spool remote from the stop and adjacent the first annular groove, the first solenoid-controlled valve controlling communication between a chamber containing the spring and the reservoir.

Normally both ends of the spool, of equal areas, are exposed to the pressure in the servo chamber, and master cylinder fluid can be applied to the brake through the unrestricted path with a spring holding the flow valve in an open position.

In a braking system for a four-wheel vehicle, the master cylinder is connected to a brake on each of the four wheels and fluid from the master cylinder is supplied to each of the driven, usually the front, wheels through a respective flow valve, each controlled by a respective first solenoid-controlled valve, the master cylinder also being connected to each rear wheel through a flow-valve assembly controlled by a first solenoid-controlled valve.

The flow valve assembly may comprise two separate flow valves, each controlled by a respective first solenoid-controlled valve, or a single flow valve in combination with a copy valve and operated by a single solenoid-controlled valve.

When an apportioning valve is fitted to modify the level of rear pressure relative to the front, upon ABS operation of the rears fluid by-passes the apportioning valve to provide full potential pressure in order to take advantage of any improvement in road friction. Similarly the first solenoid-controlled valve for the rears can be pulsed to latch the flow valve assembly to by-pass the apportioning valve if the rears are under-utilised in a laden case. In our invention failure of the auxiliary source of pressure permits the brakes to be applied manually and ABS function is cancelled even though the first solenoid-controlled valves may be inadvertently operated.

Some embodiments of our invention are illustrated in the accompany drawings in which.

Figures 1, 7:
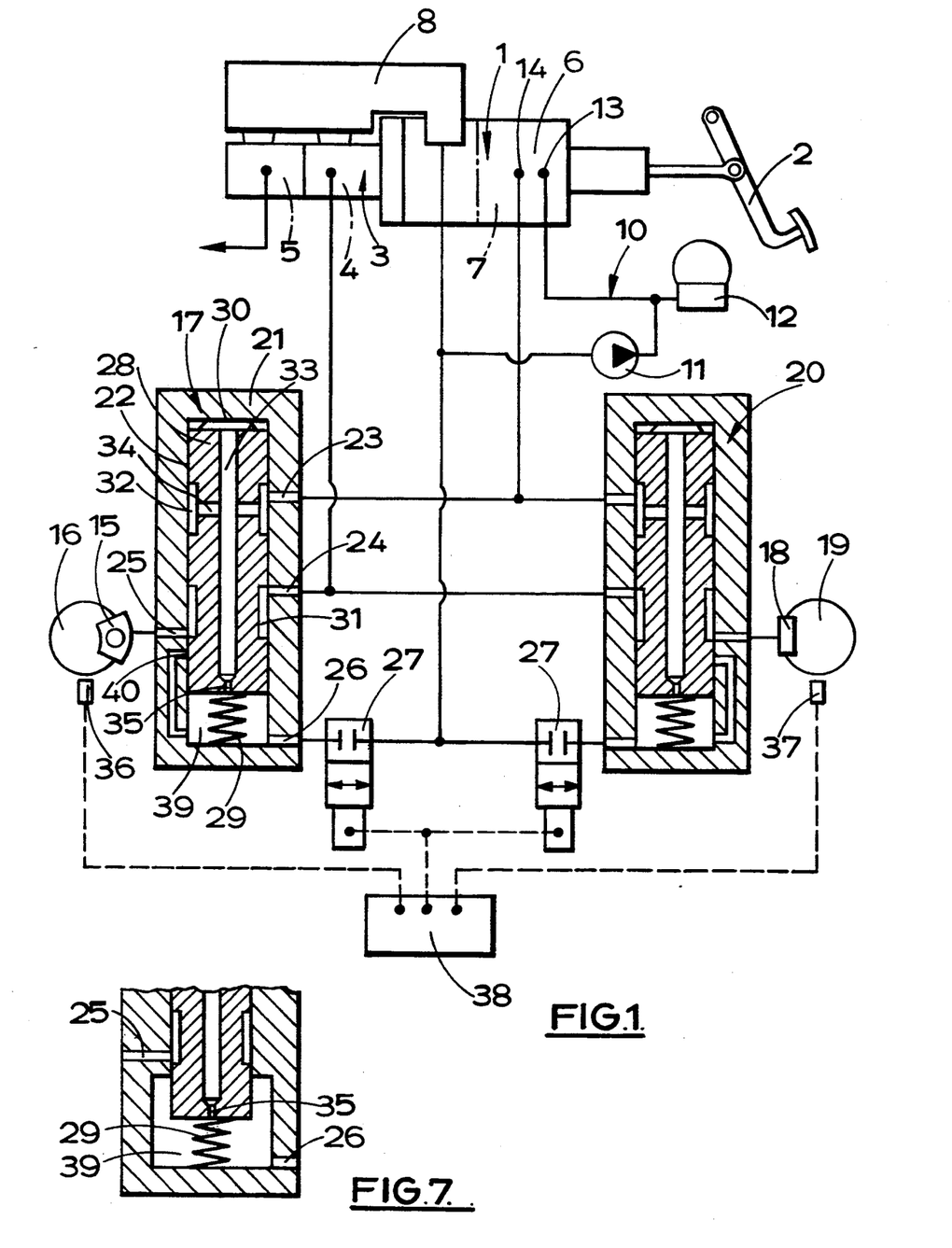
FIG. 1 is a layout of a tandem hydraulic braking system for a vehicle.
FIG. 7 is a view of a modification of a portion of a flow valve.

The hydraulic braking system illustrated in FIG. 1 of the drawings comprises a combined hydraulic booster and master cylinder assembly 1 adapted to be operated by a pedal 2. The assembly 1 comprises a tandem master cylinder 3 having primary and secondary pressure spaces 4 and 5 and an hydraulic booster 6 in which is defined a servo chamber 7. A reservoir 8 for fluid for supplying fluid to the pressure spaces through normally open recuperation valves within the pressure spaces 4,5 is mounted on the assembly 1.

An auxiliary hydraulic power supply system 10 supplies booster pressure for the servo chamber 7 under the control of a valve (not shown), in turn controlled by operation of the pedal 2. The system 10 comprises an electrically driven pump 11 adapted to draw fluid from the reservoir 8 to charge an hydraulic accumulator 12 and of which the output is connected to an inlet connection 13 to the servo chamber 7. The servo chamber 7 also has an outlet connection 14.

The primary pressure space 4 is connected to a brake 15 on a front wheel 16 of a vehicle through a flow valve 17 and to a brake 18 on a rear wheel 19, usually the diagonally opposite rear wheel, through a second flow valve 20. The outlet connection 14 from the servo chamber 7 is also connected to both flow valves 17 and 20.

The two flow valves 17 and 20 are essentially identical in construction so that only the flow valve 17 will be described in detail. As illustrated the flow valve 17 comprises a housing 21 having a longitudinally extending bore 22 closed as opposite ends and provided, in its wall, with axially spaced connections 23, 24, 25 and 26. The connection 23 is connected to the servo chamber 14, the connection 24 is connected to the pressure space 4, the connection 25 is connected to the brake 15, and the connection 26 is connected to the reservoir 8 through a normally closed solenoid-operated controlled means defined by a first solenoid-operated controlled valve 27. A spool 28 working in the bore 22 is normally urged by a spring 29 into an open position against a stop 30 defined by a face of the housing at the end of the bore adjacent to the connection 23. A first annular groove 31 in the external surface of the spool provides communication between the connections 24 and 25 when the spool is in engagement with the stop 30. A second annular groove 32 in communication with the connection 23 communicates with an axial drilling 33 through a pair of radial passages 34. The axial drilling 33 extends between opposite ends of the spool and at the end remote from the stop face 30 is provided with a restriction 35.

The behaviour of the wheels 16 and 19 is sensed by respective wheel speed sensors 36 and 37 from which signals are sent to an electronic control module 38. This, in turn, differentiates the signals and when it recognises a signal indicative of excessive acceleration, or deceleration, of a wheel emits an energising current to operate either of the normally-closed first solenoid-controlled valves 27.

The secondary pressure space 5 is connected to the remaining front and rear brakes through respective flow valves arranged in a similar manner to the flow valves 17 and 20 with the auxiliary hydraulic power system 10 also connected into the circuits in a similar manner.

For normal brake operation the brake pedal 2 is depressed and the hydraulic booster 6 operates to assist the driver in applying the master cylinder 3. Fluid from the master cylinder 3 flows to the brakes on all four wheels of the vehicle through the respective, open, flow valves 17, 20. Specifically the fluid flows between the connections 24 and 25 through the annular groove 31. At the same time a pressure equivalent to that in the master cylinder is delivered from the servo chamber 7 to the second groove 32 of each flow valve and acts on opposite ends of each spool 28 by passage through the radial passages 34 and the axial drilling 33. Equal pressures are therefore applied to the ends of the spool which are of equal areas in order to hold the spool in a balanced position in engagement with the stop 30. The pressure in a chamber 39 containing the spring 29 and equivalent to that in the servo chamber 7 acts on the normally-closed solenoid-controlled valve 27 through the connection 26. This chamber 39 is connected to a port 40 in the wall of the bore 22 spaced from the connection 25 but closed by the spool 28 when the flow valve 17 is in the closed position. Alternatively the annular groove 31 is adapted to move into a chamber 39 in the base of the housing 21 as shown in FIG. 7. This enables us to omit the port 40.

Because the pressures at the connections 23 and 24 are equal, no leakage can occur across the spool 28 from or to the first annular groove 31. Any leakage to the reservoir 8 through the solenoid-controlled valve 27 is made up from the auxiliary system 10 and not from the hydrostatic system defined by the master cylinder assembly 1.

When the force applied to the pedal 2 is released, the servo chamber 7 is relieved to the reservoir 8, and the pistons of the master cylinder return to retracted positions to release the brakes.

Should the vehicle be moving over a slippery surface and the brakes 15, 18 be applied to a level of pressure above the locking threshold, the wheels 16, 19 will decelerate rapidly and the speed sensors will send signals to the control module 38. If a front wheel, say the wheel 16, is tending to lock, the solenoid-controlled valve 27 for the flow valve 17 will be opened by an energising current from the control module 38 to connect the chamber 39 of the flow valve 17 to the reservoir 8. As a result, and due to the presence of the restriction 35 which causes a pressure drop across the spool 28, the spool is driven away from the stop face 13 by pressure in the servo chamber 7 to:

a) isolate the master cylinder 3 from the brake 15;
b) connect the brake 15 to the reservoir 8 through the annular groove 31, the port 40, and the chamber 39 to relieve pressure; and
c) move the spool to a metered position in which the connection 31 from the servo chamber 7 is substantially closed to provide a metered flow from the servo chamber 7 to the brake 15.

Upon recovery of the wheel 16 the solenoid-controlled valve 27 closes and the brake 15 is re-applied at a constant flow rate from the servo chamber 7. The master cylinder 6 remains isolated from the brake for all subsequent anti-lock cycles. This prevents an adverse pedal reaction at the pedal 2 even through the brake pressure is being rapidly corrected to control wheel behaviour.

Figure 2:
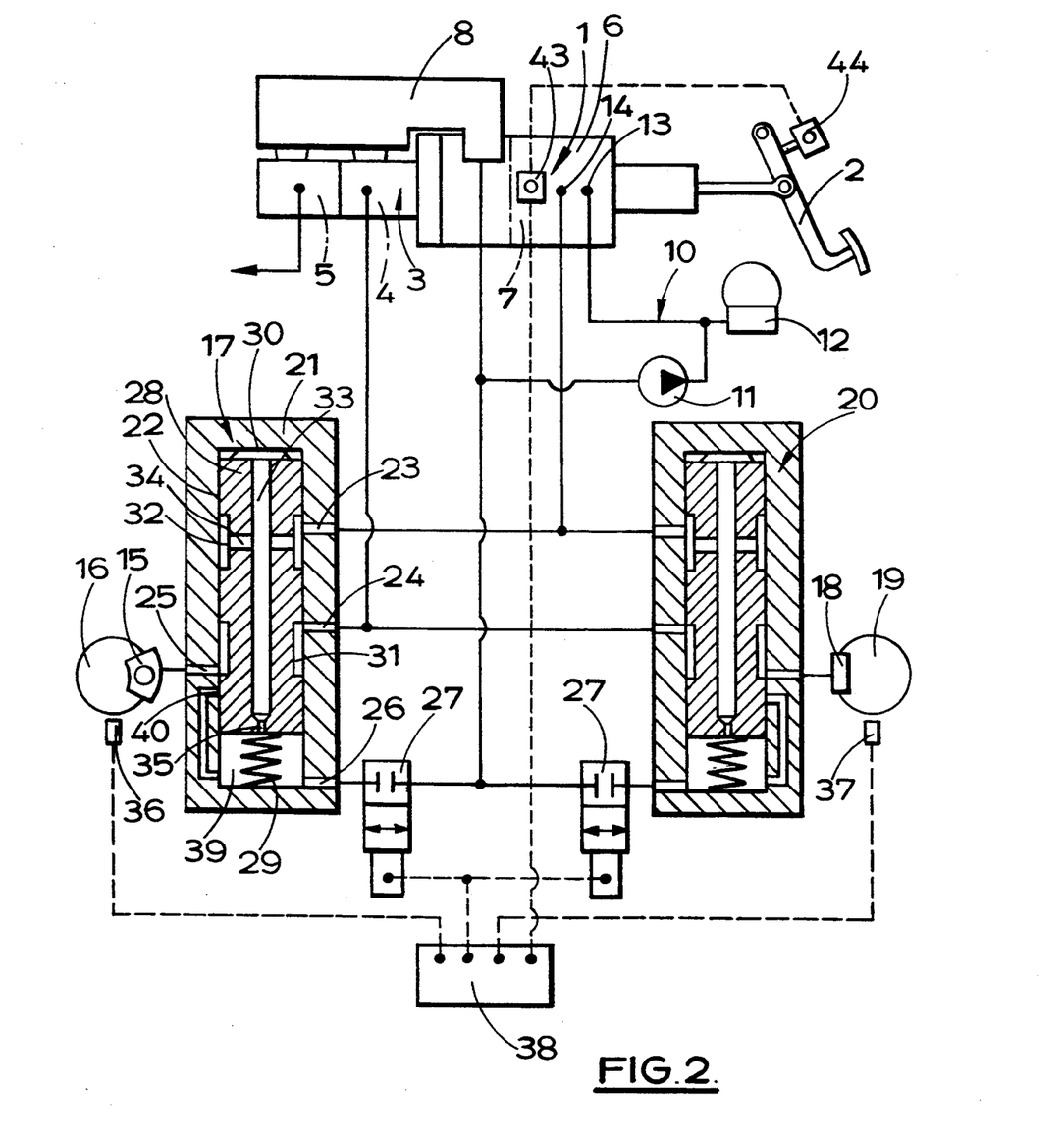
FIG. 2 is a layout similar to the system of FIG. 1 but showing a modification.

The system illustrated in FIG. 2 of the drawings is similar to the system of FIG. 1 except that it includes in addition, first and second switches 43, 44 which supply signals to the control module 38.

The first switch 43 located within the servo chamber 7 is set at a displacement by the auxiliary system 10 at a level corresponding to a high deceleration stop, say 0.8 g.

The second switch 44 is provided on the brake pedal, conventionally for the stop lamp circuit for indicating that the brakes have been applied.

The function of the first switch 43 is two fold.

Firstly, should the driver demand high deceleration the pedal travel will not become excessive since once the displacement and therefore position of the switch 43 has been reached the solenoids of the valves 27 are energised and pulsed to maintain the flow valves 17, 20 in latched positions to isolate the master cylinder assembly 1 and connect the power system 10 to the brakes 15, 18. Therefore any additional demand is made up by the power system 10 and not the master cylinder assembly 1.

The second function of the first switch 43 is to provide a means of preventing 'cadance' braking from bottoming out the master cylinder assembly 1. Typically if a driver performs 'cadance' braking or rapid on/off braking that caused the wheels momentarily to lock, a situation can occur where the brake fluid sourced by the master cylinder assembly 1 is continually being dumped to the reservoir 8 before the power system 10 is able fully to replenish the brake. This will cause the driver's pedal 2 gradually to 'sink' upon each application of the 'cadance' cycle. Should this occur then the pedal 2 will be allowed to 'sink' to the preset switch level. All further brake applications, therefore, are under the control of the power system 10 and not the master cylinder assembly 1. Therefore the pedal will not 'sink' past the switch position.

When the system is used on a vehicle with a high rear axle load (e.g. Range Rover Registered Trade Mark) where a high boost ratio is required, the flow valve 24 for the rear brake 18 is latched by pulsing the solenoid valve 27 at a rate that holds the spool in its latched position whilst not allowing any significant loss in brake fluid, and the rear brakes 18 are applied under the direct control of the brake booster. This means that the brake booster 7 only has to boost the master cylinder assembly supporting a 'front' brake system. The required boost ratio is therefore much lower, because the displacement required from the master cylinder assembly 1 is less for normal operation. Consequently the diameter of the bore may be smaller. This, in turn, provides the 'mechanical advantage' required to produce a necessary reduction in the input boost required. In the booster failed case the rear brake volume is now provided by the master-cylinder assembly. This extra demand on the master cylinder of course means an increased pedal travel but the lower boost ratio is maintained.

Figure 3:
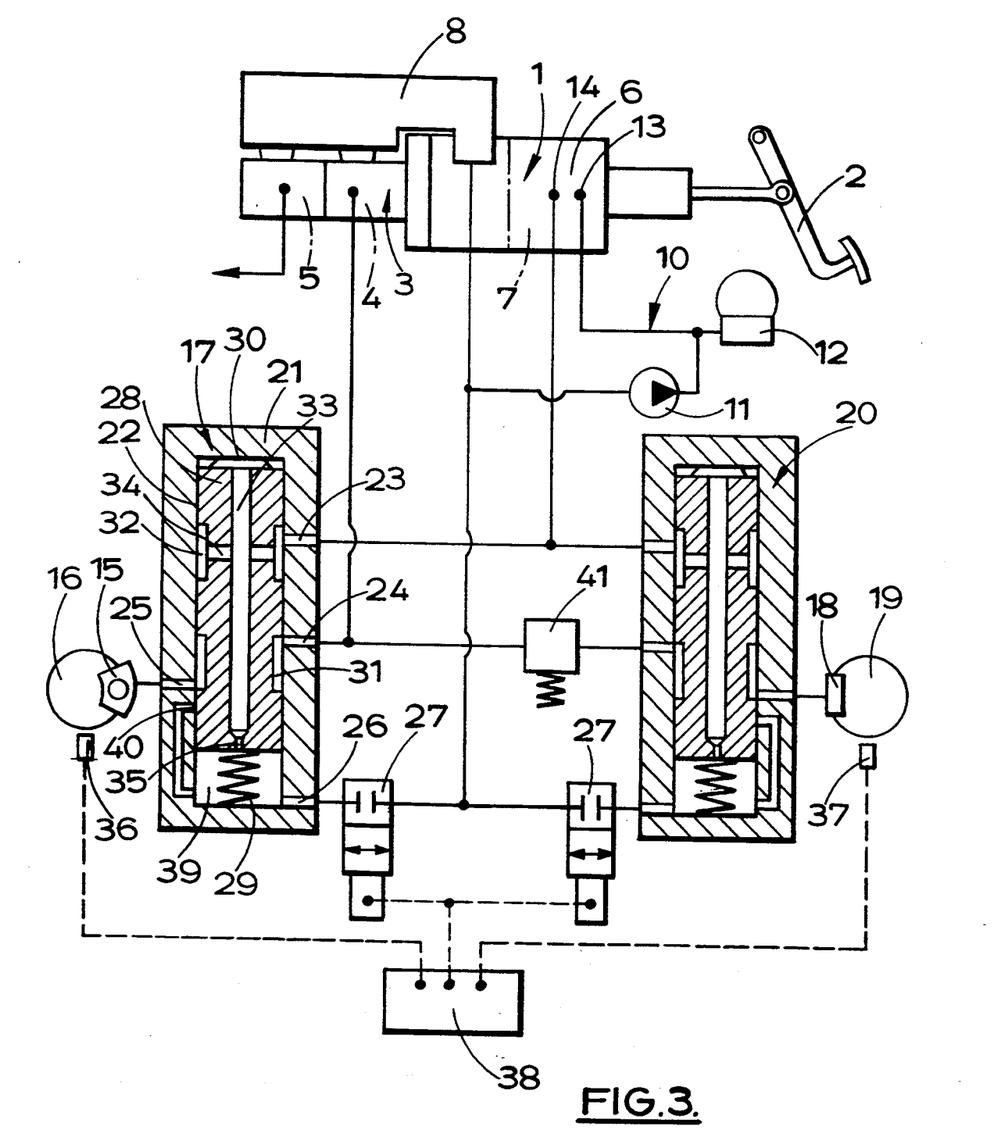
FIG. 3 is a layout of another modified system.

In the system illustrated in FIG. 3 of the drawings each rear wheel 19 is fitted with a pressure/load conscious apportioning valve 41. This ensures that the front wheels will lock before the rear wheels in any laden condition of the vehicle with the apportioning valve 41 being by-passed when in ABS mode. For example, if the rear sensor 37 relays a skid signal, the solenoid-controlled valve 27 will cause the flow valve 20 to open to relieve pressure from the brake 18, and the pressure will be re-applied to the brake 18 by the pressure in the servo chamber 7. Similarly, if the vehicle is fully laden on a good road with the fronts in ABS mode, the rear sensors 37 will relay that the wheels slip is low. This signifies that the rear wheels brakes 18 are under-utilised by the apportioned rear pressure. To increase rear pressure, the solenoid of the solenoid-controlled valve 27 corresponding to the flow valve 20, is pulsed to latch the flow valve 20 and full pressure from the servo chamber 7 can be applied to the rear brakes 18 to improve the stopping power applied to the vehicle.

In the event of a failure of the electrical system, the flow valves 17, and 20 remain in the rest position, and the pressure applied to the rear brakes is modified by the apportioning valve 41 to prevent a premature rear wheel lock.

It is unusual for a braking system to incorporate this particular feature within ABS and normally extra components are required to permit full rear braking when controlled by ABS but apportioned rear pressure when brakes are applied in a conventional manner.

The construction and operation of the system shown in the layout of FIG. 3 is otherwise the same as that of FIG. 1 and corresponding references have been applied to corresponding parts.

Figure 4:
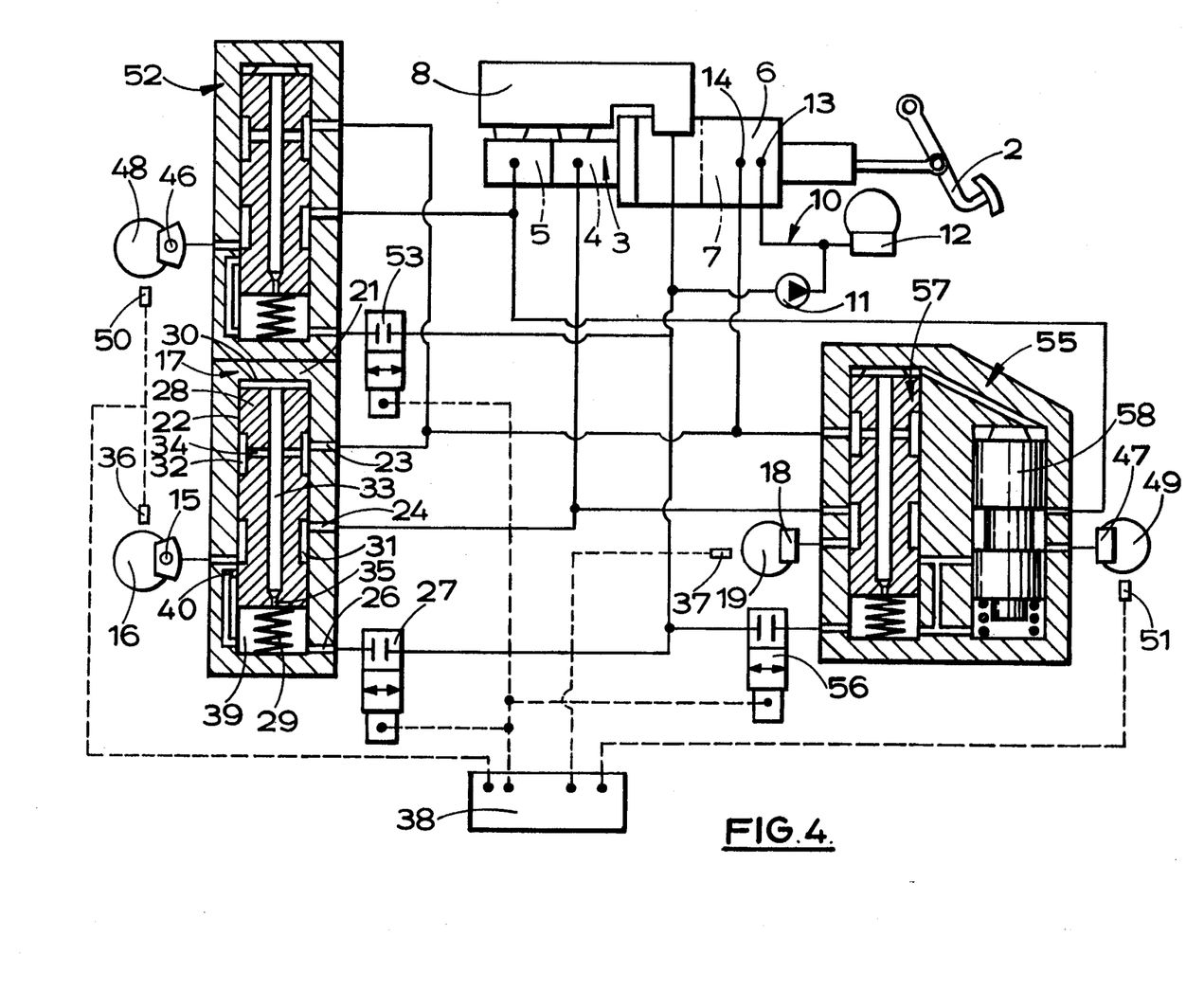
FIG. 4 is a layout of yet another modified system.

The braking system shown in the layout of FIG. 4 is similar to that of FIGS. 1 and 3 except that the front and rear brakes 46 and 47 for the remaining front and rear wheels 48 and 49 and respective wheel speed sensors 50 and 51, have been illustrated. A flow valve 52 and a solenoid-controlled valve 53, both similar to the flow valve 17 and the solenoid-controlled valve 27, are provided for the front wheel 48. The two rear wheel brakes 18 and 47 are operated by a single flow valve assembly 55 under the control of a single solenoid-controlled valve 56.

The flow valve assembly 55 may comprise two separate flow valves, each similar in construction to the flow valve 17. Alternatively, as illustrated, a single flow valve 57, similar to the flow valve 17, may be utilised in conjunction with a copy valve 58.

In another construction the flow valve assembly 55 is operated by the single solenoid-controlled valve 56. In the event of a skid signal from either sensor 37 or 51, both rear brakes 18 and 47 are relieved. This is a common ABS philosophy, (known as 'select low used'), to improve the stability of the rear end of the vehicle. For example, if the vehicle has its wheels on road surfaces of different friction, the two rear brake pressures are maintained at a level permitted by the wheel on the lower friction surface. The rear wheel on the surface of higher friction, being under braked, provides extra lateral stability and prevents the rear of the vehicle from sliding sideways.

In the systems described above the brakes can still be applied even though the auxiliary power system 10 may fail with consequent loss of pressure in the servo chamber 7. Under these circumstances all the brakes can be operated manually by direct "push through" onto the master cylinder 3. Such a pressure loss does mean, however, that the brakes cannot be re-applied in ABS mode so ideally the flow valves 17, 20 and 57 should remain inactive. Because the flow valves 17, 20, 57 are driven by the auxiliary power supply system 10 and this is no longer available, the flow valves 17, 20, 57 remain in their rest positions with the master cylinder 3 connected to the brakes irrespective of any action from the solenoid-controlled valves 27, 53, 56. Should hydraulic pressure fail the solenoids do not latch, thereby ensuring that the brakes can be applied normally. This means that the brakes can be applied normally should the pump 11 fail.

Figure 5:
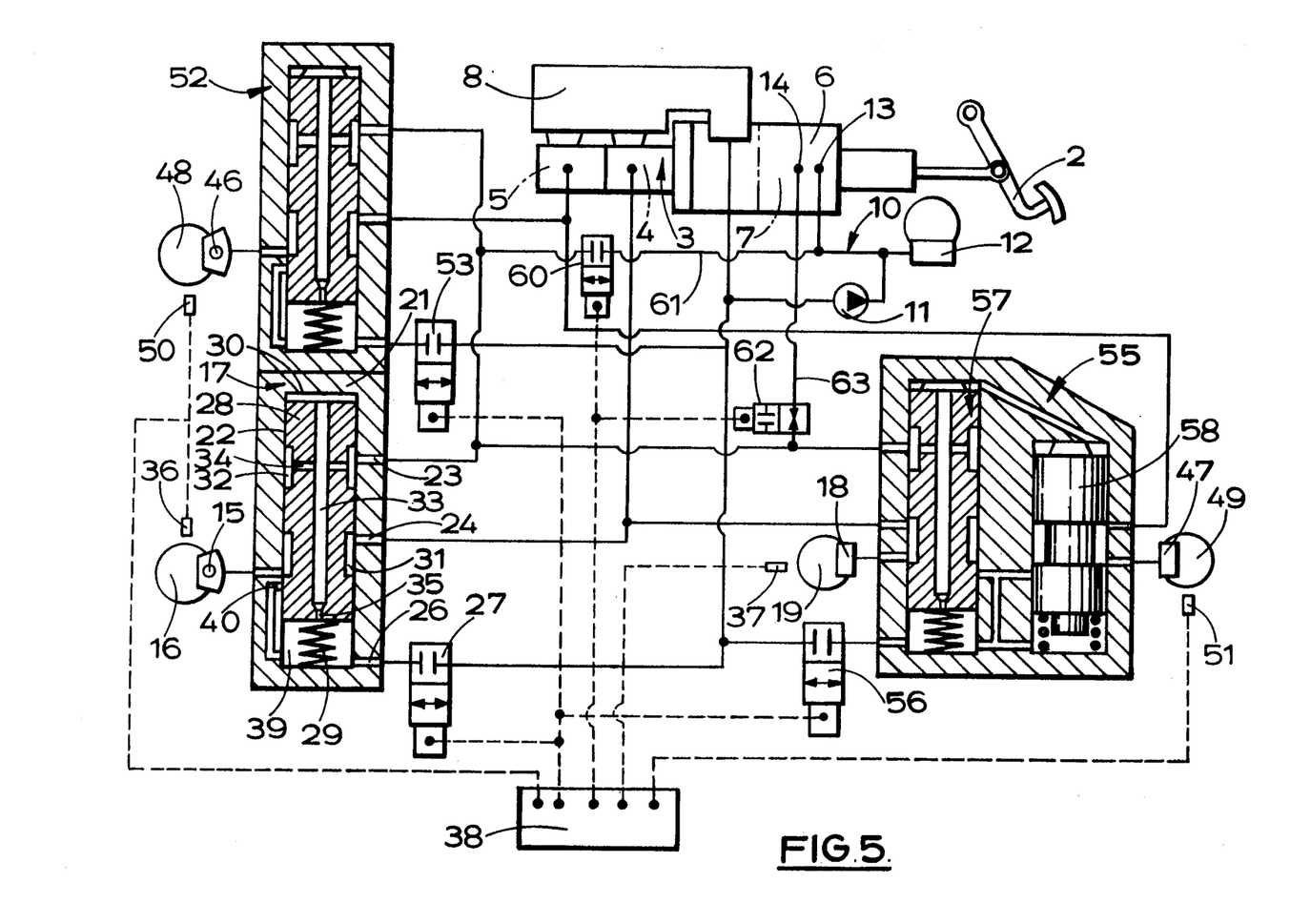
FIG. 5 is a layout similar to the system of FIG. 4 but modified direct as a hill holder and Traction Control.

The system shown in the layout of FIG. 5 of the accompanying drawings is similar to FIG. 4 but has been modified by the addition of a second normally closed solenoid-controlled valve 60 and a normally-open solenoid controlled valve 62. The valve 61 is located in a by-pass line 61 between the accumulator and the connections between the servo chamber 7 and the flow valves 17, 52 and 57, and the third valve 62 is located in a line from the outlet connection 14 and leads to all three of the flow valves 17, 52 and 57.

During normal operation of the brakes upon ABS as described above the solenoid-controlled valve 60 is closed, and the solenoid-controlled valve 62 is open.

Assuming that the system as shown in the layout of FIG. 5 is installed in a four-wheel vehicle of the kind in which the front wheels 16 and 48 are driven, should one of the front wheels, say the wheel 16, start to spin during vehicle acceleration on a split friction surface, the solenoid-controlled valve 62 closes to prevent return flow into the servo chamber 7, and the solenoid-controlled valve 60 opens to connect the flow valves 17, 52 and 57 to the accumulator 12. At the same time the solenoid-controlled valve 27 of the flow valve 17 controlling the brake 50 on the spinning wheel 16 is pulsed once to latch the flow valve 17 and to isolate the brake 15 from the master cylinder 3. As a result, the brake 15 is applied at a controlled rate to bring the wheel 16 under control. Upon wheel recovery, the solenoid-controlled valve 27 is opened or pulsed to relieve brake pressure. Subsequent control of the wheel 16 is effected by opening and closing the solenoid-controlled valve 27.

At a predetermined speed, for example 30 KPH, the solenoid-controlled valves 27 and 6 close, and the solenoid-controlled valve 62 opens. In consequence the flow valve 17 is restored to its rest position with the spool 28 in engagement with the stop face 30. This allows the brake pressure to be released to the reservoir 8 through the open, recuperation valve, between the primary pressure space 4 of the master cylinder 3 and the reservoir 8.

The brake 46 on the other front wheel 48, and the brakes 18 and 47 on the rear wheels 19 and 49, remain "off" during the correction control sequence described above because, although pressure from the accumulator 12 is applied to the respective flow valves 52 and 57, it cannot pass into the brakes 48, 18 and 49. During Traction Control, neither the master cylinder 3 nor the hydraulic booster 6 are pressurised so that the non-controlled wheels 48, 19, 49 are connected to the reservoir 8 through the master cylinder 3.

If a driver transfers his foot from the accelerator to the brake pedal whilst in the Traction Control mode, the solenoid-controlled valves 27, 60, 62 are de-energised. This means that the valves 27 and 60 revert to their normal closed positions, and the valve 62 reverts to its normal open position. The flow valve 17 immediately returns to its rest position so that the brakes can be applied in the usual way.

Conventional Traction Control systems isolate the non-spinning wheels by energising three ABS solenoids and two Traction Control solenoids. For a long hill ascent on a road surface of differing frictions such conventional systems require a considerable power output from the control module. For example, if each solenoid has a 40 W rating, the control module must supply 200 watts continuously with a cyclic increase to 240 watts whenever the ABS solenoids of the controlled wheel are energised.

In the system described above with reference to FIG. 5 of the accompanying drawings only the two Traction Control solenoids of the valves 60 and 62 are continuously energised so that only 80 watts of power is required from the control module 38 with a cyclic increase to 120 watts whenever the ABS solenoid of the valve 27 of the control wheel 16 is energised. Our system also has the advantage that the "fast response" ABS solenoids do not have to be continuously rated.

Should the system shown in the layout of FIG. 5 of the accompanying drawings be incorporated in a vehicle of the rear-wheel drive type the sequence is similar to that discussed above but an extra ABS flow valve and solenoid is added independently to control the rear wheels in the same way as the front wheels were controlled.

If a pressure conscious valve is fitted, such as the valve 41 shown in the layout of FIG. 3 of the accompanying drawings, it is by-passed to provide the maximum potential pressure to the rear wheel brakes. This is an important consideration because the smaller rear wheel brakes require a much higher pressure for Traction Control than that needed at the front wheels. Typical values are 100 bar for the rears, and 40 bar for the fronts.

The system of FIG. 5 of the accompanying drawings can be operated to hold the vehicle on a hill when braked to a halt. When this operation is required the solenoid-controlled valve 62 is closed, the valve 60 is opened, and the solenoid-controlled valve 56 is pulsed to latch the flow valve 57 of the rear flow valve assembly 55. As a result the pressure from the accumulator 12 is applied to both rear brakes 18 and 47 and simulates the operation of a manual parking brake. When the clutch is engaged to drive away, the valves 60, 62 and 62 revert to their respective inoperative positions, the flow valve 57 and the copy valve 58 move to their rest positions, and the rear brakes 19, 49 are released by a reverse flow of fluid through the primary and secondary pressure spaces 4, 5 and back into the reservoir 8 through the respective open recuperation valves.

Figure 6:
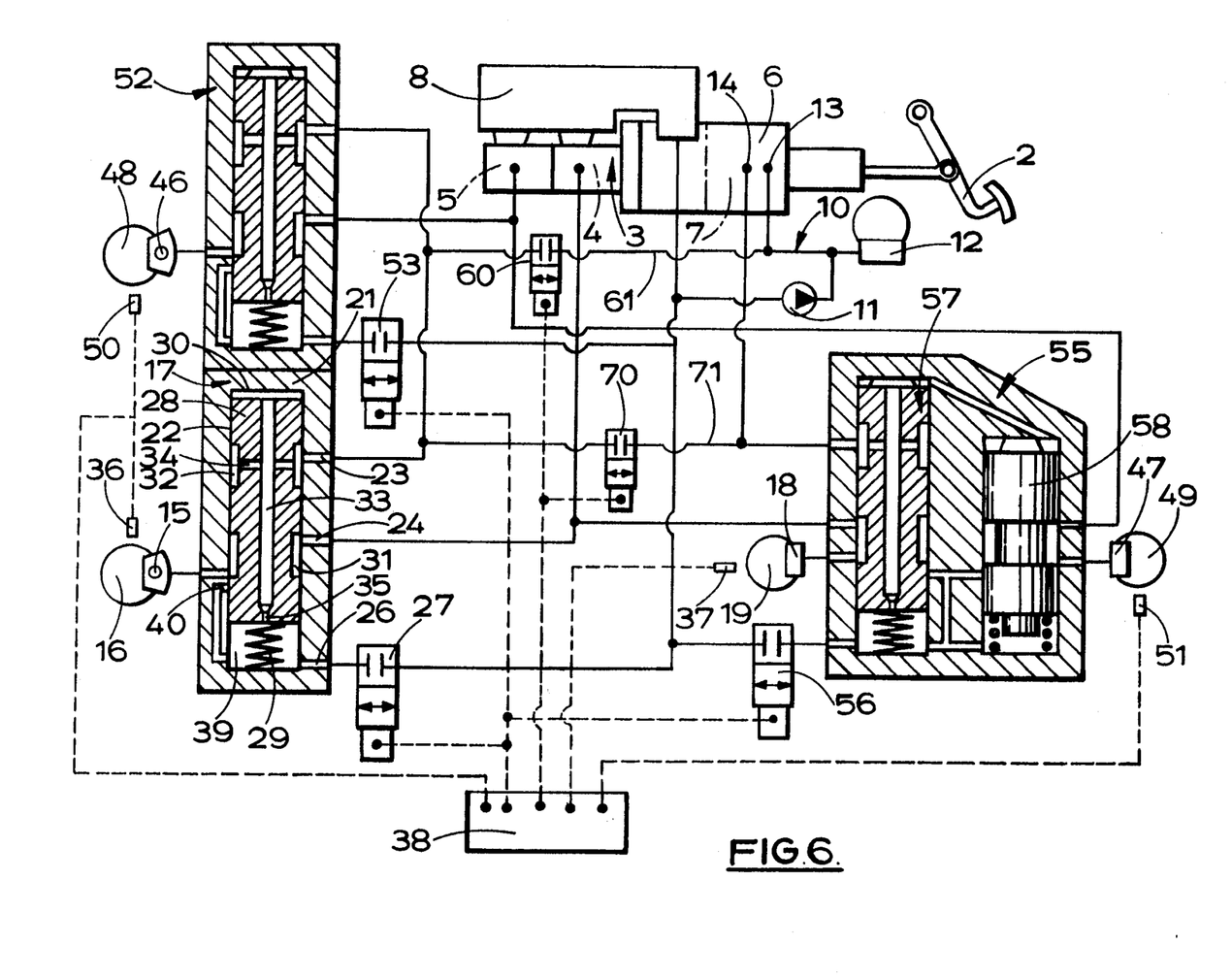
FIG. 6 is a layout similar to FIG. 5 but showing a modification.

The braking system illustrated in FIG. 6 of the drawings is similar to FIG. 5 except the normally open solenoid-controlled valve 62 is replaced by a normally open solenoid-controlled valve 70 located in the line 71 which interconnects the front and rear flow valves 17, 52 and 57 to the servo chamber 7 through the connection 14.

In the system illustrated in the layout of FIG. 6 energisation of the two Traction Control solenoids of the valves 60 and 70 is operative to direct fluid from the accumulator 12 to the front, driven wheels 16 and 48 but not to the rear wheels 19, 49 nor the servo chamber 7 of the booster.

The system illustrated in FIG. 6 of the drawings is otherwise the same as FIG. 5 and corresponding reference numerals have been applied to corresponding parts.

In the systems described above brake bleeding of the brakes of an installed system can be achieved by setting the control module 38 in a "bleed mode" in which the solenoid-controlled valves are open. When the brake pedal 2 is then held in a depressed position, the auxiliary power system 10 is adapted to fill the flow valves 17, 20; 17, 52 and 57, and the brake circuits.

What I claim is:

1. A hydraulic braking system for a vehicle comprising a pedal-operated hydraulic booster and master cylinder assembly for applying a brake on a wheel and having a master cylinder and a servo chamber, a control module responsive to the behavior of said wheel, an auxiliary hydraulic power supply defining a booster pressure in the servo chamber, a flow valve assembly through which fluid is supplied to said brake, and a solenoid-controlled valve means for controlling said flow valve at least for brake re-application during ABS by application to said flow valve of control fluid from said servo chamber in response to signals from said control module.

2. A braking system according to claim 1, wherein said auxiliary hydraulic power supply comprises an electrically driven pump, and a hydraulic accumulator charged by said pump.

3. A braking system according to claim 1, wherein said power supply includes means for utilising to provide necessary power to re-apply said brake during ABS, retain or apply brake pressure to act as a hill holder, and apply the brake on said wheel independently of the master cylinder for traction control.

4. A braking system according to claim 1, including means for utilising said power supply to achieve brake bleeding after assembly on the vehicle.

5. A braking system according to claim 1, including a reservoir for fluid, wherein said solenoid-controlled means comprises a single first solenoid-controlled valve situated in a return line from said flow valve to said reservoir for fluid.

6. A braking system according to claim 5, wherein a spring acts to hold said flow valve in a fully open position, and said first solenoid-operated valve is movable between a closed position and an open position, said flow valve being held in the open position by said control fluid when said first valve is in said closed position so that fluid can be applied from said master cylinder to said brake through an unrestricted path, and when said first valve is in the open position, to connect said flow valve to said reservoir said flow valve moves against the loading in said spring sequentially to isolate said master cylinder from said brake, connect said brake to said reservoir, and move to a metering position in which fluid from said servo-chamber can be metered into said brake at a controlled rate.

7. A braking system according to claim 6, including a hydraulic accumulator and two further second and third solenoid-controlled valves, wherein said second and third valves are located respectively between said accumulator and said flow valve, and at an outlet from said servo chamber, whereby said system can be adapted for traction control on said wheel and to enable said system to act as a hill holder.

8. A braking system according to claim 7, wherein traction control is achieved by means for closing said third valve to prevent reverse flow into the servo chamber, means for opening said second valve to supply fluid to said flow valve, and at the same time pulsing said first valve so that said control fluid sets said flow valve in a latched position with said brake applied from said accumulator but isolated from said master cylinder itself.

9. A braking system according to claim 1, wherein said flow valve comprises a housing having an axial bore, a spool working in said bore, a spring urging said spool against a stop defined by one end of said bore, and wherein said spool is provided with a pair of axially spaced annular grooves with said master cylinder connected to said brake through said first annular groove, and said servo chamber connected to said second annular groove, at least one radial passage connecting the second annular groove to a longitudinal passage extending between opposite ends of said spool with a restricted orifice disposed in said spool between said radial passage and the end of said spool remote from said stop and adjacent said first annular groove, said first solenoid-controlled valve controlling communication between a chamber containing said spring and said reservoir.

10. A braking system according to claim 9, wherein both ends of said spool are substantially of equal areas, and normally both ends are exposed to the pressure in said servo chamber, in which master cylinder fluid can be applied to the brake through the unrestricted path, with said spring holding said flow valve in an open position.

11. A braking system according to claim 1, wherein said flow valve assembly comprises two separate flow valves, and a separate solenoid-controlled valve is adapted to control each respective flow valve.

12. A braking system according to claim 11, wherein incorporating means operative upon failure of said power supply to ensure that said flow valve assembly is adapted to remain in a rest position with said master cylinder connected to said brake, irrespective of any action of said solenoid-controlled valve means.

13. A braking system according to claim 1, wherein said flow valve assembly comprises a single flow valve in combination with a copy valve and operated by a single solenoid-controlled valve.

14. A braking system according to claim 1, including an apportioning valve to modify the level of rear pressure relative to the front in which upon ABS operation of the rear brake fluid by-passes the apportioning valve to provide full potential pressure in order to take advantage of any improvement in friction.

* * * * *